United States Patent
Trilla Rodriguez et al.

(10) Patent No.: US 12,487,825 B2
(45) Date of Patent: Dec. 2, 2025

(54) CONTROLLING SPECULATIVE ACTIONS BASED ON A HIT/MISS PREDICTOR

(71) Applicant: INTERNATIONAL BUSINESS MACHINES CORPORATION, Armonk, NY (US)

(72) Inventors: David Trilla Rodriguez, New York, NY (US); Alper Buyuktosunoglu, White Plains, NY (US); Dominic DiTomaso, Hyde Park, NY (US); Craig R Walters, Highland, NY (US); Ram Sai Manoj Bamdhamravuri, Boston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 18/585,283

(22) Filed: Feb. 23, 2024

(65) Prior Publication Data
US 2025/0272098 A1 Aug. 28, 2025

(51) Int. Cl.
*G06F 9/30* (2018.01)
*G06F 9/38* (2018.01)

(52) U.S. Cl.
CPC ........ *G06F 9/30047* (2013.01); *G06F 9/3842* (2013.01); *G06F 9/3861* (2013.01)

(58) Field of Classification Search
CPC ... G06F 9/30047; G06F 9/3842; G06F 9/3861
See application file for complete search history.

(56) References Cited

U.S. PATENT DOCUMENTS

| | | | |
|---|---|---|---|
| 10,007,523 B2 | 6/2018 | Srinivasan et al. | |
| 10,127,044 B2 | 11/2018 | Williams et al. | |
| 10,157,137 B1* | 12/2018 | Jain | G06F 12/0864 |
| 10,503,538 B2 | 12/2019 | Gschwind et al. | |
| 10,719,441 B1 | 7/2020 | Yin et al. | |
| 10,936,319 B2 | 3/2021 | Srinivasan et al. | |
| 11,080,062 B2 | 8/2021 | Pota et al. | |
| 11,709,679 B2 | 7/2023 | Al Sheikh et al. | |
| 11,829,764 B2 | 11/2023 | Pota et al. | |
| 2011/0191546 A1* | 8/2011 | Qureshi | G06F 12/0831 711/146 |
| 2014/0143783 A1* | 5/2014 | Bose | G06F 1/324 718/102 |
| 2023/0108964 A1* | 4/2023 | Isen | G06F 12/0859 711/154 |

(Continued)

OTHER PUBLICATIONS

Anonymous, "Method for Pipelining Line Predictor," IP.com No. IPCOM000018664D, Jul. 30, 2003, pp. 1-7 (including cover sheet).

(Continued)

*Primary Examiner* — Shawn Doman
(74) *Attorney, Agent, or Firm* — Edward J. Wixted, III, Esq.; Blanche E. Schiller, Esq.; Heslin Rothenberg Farley & Mesiti P.C.

(57) ABSTRACT

Processing within a computing environment is facilitated by using cache hit-miss predictions. A cache hit-miss prediction is determined for a memory access instruction using a predictor. One or more speculative actions are controlled, based on determining the cache hit-miss prediction is a miss. The controlling is further based on a type of cache design.

20 Claims, 10 Drawing Sheets

(56) References Cited

U.S. PATENT DOCUMENTS

| | | | | |
|---|---|---|---|---|
| 2023/0409478 A1* | 12/2023 | Chofleming | ........ | G06F 12/0895 |
| 2024/0231887 A1* | 7/2024 | Ma | ...................... | G06F 12/0862 |
| 2025/0045206 A1* | 2/2025 | Shyvers | .............. | G06F 12/0864 |

OTHER PUBLICATIONS

Anonymous, "Value Prediction Implementation," IP.com No. IPCOM000263479D, Sep. 3, 2020, pp. 1-5 (including cover sheet).

Anonymous, "Most Frequent Miss Interval Instruction Prefetcher," IP.com No. IPCOM000266711D, Aug. 12, 2021, pp. 1-2 (including cover sheet).

Yoaz, Adi et al., "Speculation Techniques for Improving Load Related Instruction Scheduling," Proceedings of the 26th International Symposium on Computer Architecture, Aug. 2002, pp. 1-12.

Peir, Jih-Kwon et al., "Bloom Filtering Cache Misses for Accurate Data Speculation and Prefetching," ICS '02: Proceedings of the 16th international conference on Supercomputing, Jun. 2002, pp. 189-198.

Bennett, James E. et al., "Reducing Cache Miss Rates Using Prediction Caches," Computer Systems Laboratory, Stanford University, Technical Report No. CSL-TR_96-707, Oct. 1996, pp. 1-26.

CSE 471—Advanced Caching Techniques, Spring 2014 (no further date information available) pp. 1-9.

Jalili, Majid et al., "Reducing Load Latency with Cache Level Prediction," University of Texas at Austin, Mar. 2021, pp. 1-12.

Tyson, Gary et al., "A Modified Approach to Data Cache Management," Proceedings of the 28th Annual International Symposium on Microarchitecture, Nov. 1995, pp. 93-103.

Lee, Jongmin et al., "Filter Data Cache: An Energy-Efficient Small L0 Data Cache Architecture Driven by Miss Cost Reduction," IEEE Transactions on Computers, vol. 64, No. 7, Jul. 2015, pp. 1927-1939.

Qureshi, Moinuddin et al., "Fundamental Latency Trade-offs in Architecting DRAM Caches," 2012 IEEE/ACM 45th Annual International Symposium on Microarchitecture, Dec. 2012, pp. 235-246.

Anonymous, "Avoiding Deadlocks in a Multi-Processor Environment with a First Level Cache Using a Logical Directory," IP.com No. IPCOM000271077D, Oct. 12, 2022, 5 pages (including cover).

Wu, Carole-Jean et al., "SHIP: Signature-based Hit Predictor for High Performance Caching," Micro-44: Proceedings of the 44th Annual IEEE/ACM International Symposium on Microarchitecture, Dec. 2011, pp. 430-441.

Tullen, Dean, "Improving Cache Performance—Reducing Misses," 2020 (no further date information), 9 pages.

Xiao, Jun et al., "Floria: A Fast and Featherlight Approach for Predicting Cache Performance," ICS '23: Proceedings of the 37th International Conference on Supercomputing, Jun. 2023, pp. 25-36.

Sim, Jaewoong et al., "A Mostly-Clean DRAM Cache for Effective Hit Speculation and Self-Balancing Dispatch," Micro-45: Proceedings of the 2012 45th Annual IEEE/ACM International Symposium on Microarchitecture, Dec. 2012, pp. 247-257.

Anonymous, "Dynamic Cache Reservation for Virtual Machine Applications in Cloud," IP.com No. IPCOM000233167D, Nov. 28, 2013, pp. 1-6 (+ cover).

Lu, Xiaoyang et al., "CARE: A Concurrency-Aware Enhanced Lightweight Cache Management Framework," Illinois Tech, 2022 (no further date information available), 30 pages.

Anonymous, "Method and Apparatus for Dynamic Cache Bypass and Insertion," IP.com No. IPCOM000223644D, Nov. 20, 2012, pp. 1-6 (+ cover).

* cited by examiner

CONTROLLING SPECULATIVE ACTIONS BASED ON A HIT/MISS PREDICTOR

BACKGROUND

One or more aspects relate, in general, to processing within a computing environment, and in particular, to controlling speculative actions within the computing environment.

Certain instructions, such as load and store instructions, move data from/to memory. For instance, a load instruction moves data from memory to a register, and a store instruction moves data from a register to memory. To improve processing speed in moving the data and/or in accessing the data, cache memory is employed. For instance, a load instruction attempts to access the data to be moved in a cache memory and if it is not available in the cache memory (a cache miss), then it accesses the data in memory.

Existing industry processor/cache designs commonly speculate and optimize around the presumption that the actions in their pipelines will observe a cache hit during common operations. That is, the data to be accessed is in the cache. While this benefits the cache hit scenario, it introduces negative side effects in the cache miss scenario. This is often observed at the system level (power) and/or incurred on subsequent operations in the pipeline (queuing).

SUMMARY

Shortcomings of the prior art are overcome, and additional advantages are provided through the provision of a computer-implemented method. The computer-implemented method includes determining a cache hit-miss prediction for a memory access instruction. The determining the cache hit-miss prediction for the memory access instruction uses a predictor. Based on determining the cache hit-miss prediction is a miss, one or more speculative actions are controlled. The controlling is further based on a type of cache design.

Computer-implemented methods, computer systems and computer program products relating to one or more aspects are described and claimed herein. Each of the embodiments of the computer-implemented method may be embodiments of each computer system and/or computer program product and vice-versa. Further, each of the embodiments is separable and optional from one another. Moreover, embodiments may be combined with one another. Each of the embodiments of the computer-implemented method may be combinable with aspects and/or embodiments of each computer system and/or computer program product, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
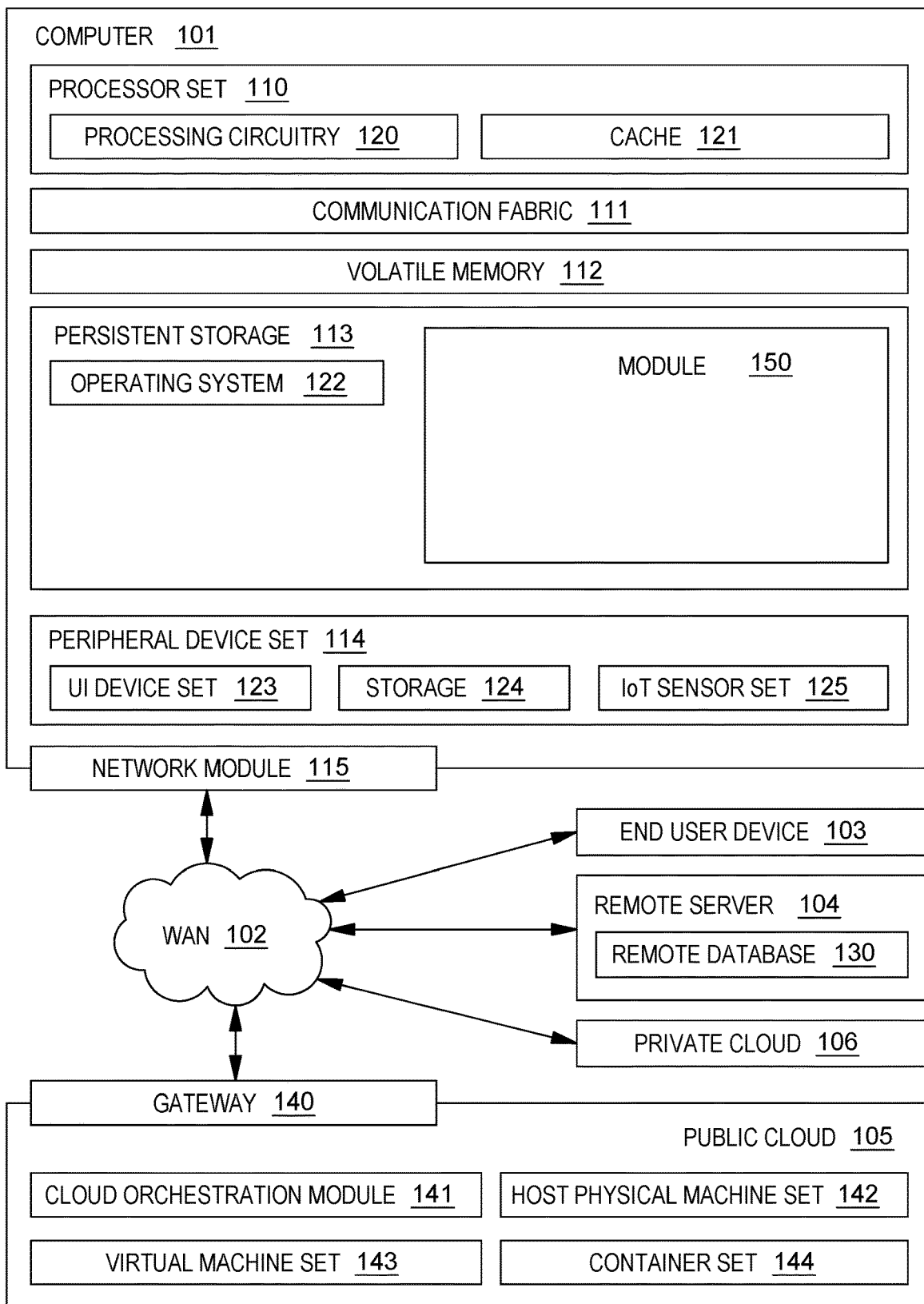
FIG. 1 depicts one example of a computing environment to incorporate and use one or more aspects of the present disclosure.

In accordance with one or more aspects of the present disclosure, a capability is provided to facilitate processing within a computing environment. In one or more aspects, the capability includes using a hit/miss predictor (also referred to herein as a predictor or a miss predictor) to predict whether a cache miss or hit is predicted for a memory access instruction (e.g., a load instruction, a store instruction or another memory access instruction). Based on the cache hit-miss prediction (also referred to as a prediction herein), a speculative action is controlled (e.g., performed, suppressed, etc.). In one example, the speculative action is controlled based on the type of cache design.

In one or more aspects, based on a cache miss prediction and the type of cache design being a bank/directory-based design, the speculative action of suppressing speculative cache accesses is performed. Further, in one or more aspects, based on a cache miss prediction and the type of cache design being a coherent-based design, the speculative action of performing speculative off-cache requests for data is performed. One example of off-cache requests is off-chip requests. Other examples of an off-cache request is a request to another level of cache, another cache, memory, etc. Other examples of speculative actions, cache design types and/or off-cache requests are possible.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that performs, e.g., cache hit-miss prediction, controlling speculative actions based on cache hit-miss predictions and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code or logic involved in performing the inventive methods, such as module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods.

Communication fabric 111 is the signal conduction paths that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

In one example, block 150 may include instructions, such as memory access instructions, based on which cache hit/miss accesses are predicted and based thereon, speculative actions are controlled. In one or more aspects, block 150 may include additional, less and/or different code. Further, in one or more aspects, block 150 may not be used. Various examples are possible.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
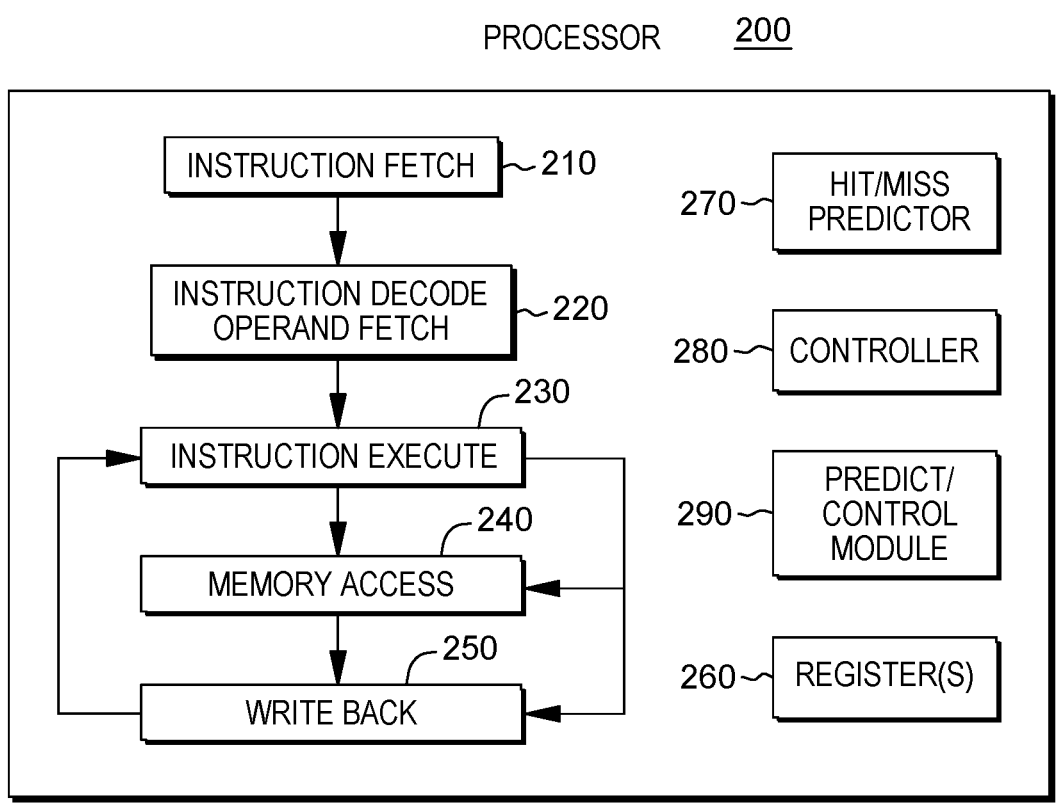
FIG. 2 depicts one example of further details of a processor of a processor set of FIG. 1, in accordance with one or more aspects of the present disclosure.

In one example, a processor (e.g., of processor set 110) includes a plurality of functional components (or a subset thereof and/or additional components) used to execute instructions. As depicted in FIG. 2, in one example, a processor 200 includes a plurality of functional components including, for instance, an instruction fetch component 210 to fetch instructions to be executed; an instruction decode/operand fetch component 220 to decode the fetched instructions and to obtain operands of the decoded instructions; one or more instruction execute components 230 to execute the decoded instructions; a memory access component 240 to access memory for instruction execution, if necessary; and a write back component 250 to provide the results of the executed instructions. One or more of the components may access and/or use one or more registers 260. Further, in accordance with one or more aspects, one or more of the components may be coupled to and/or use a hit/miss predictor 270, a controller 280 and/or a predict/control module 290. Additional, fewer and/or other components may be used in one or more aspects of the present disclosure.

Figure 3A:
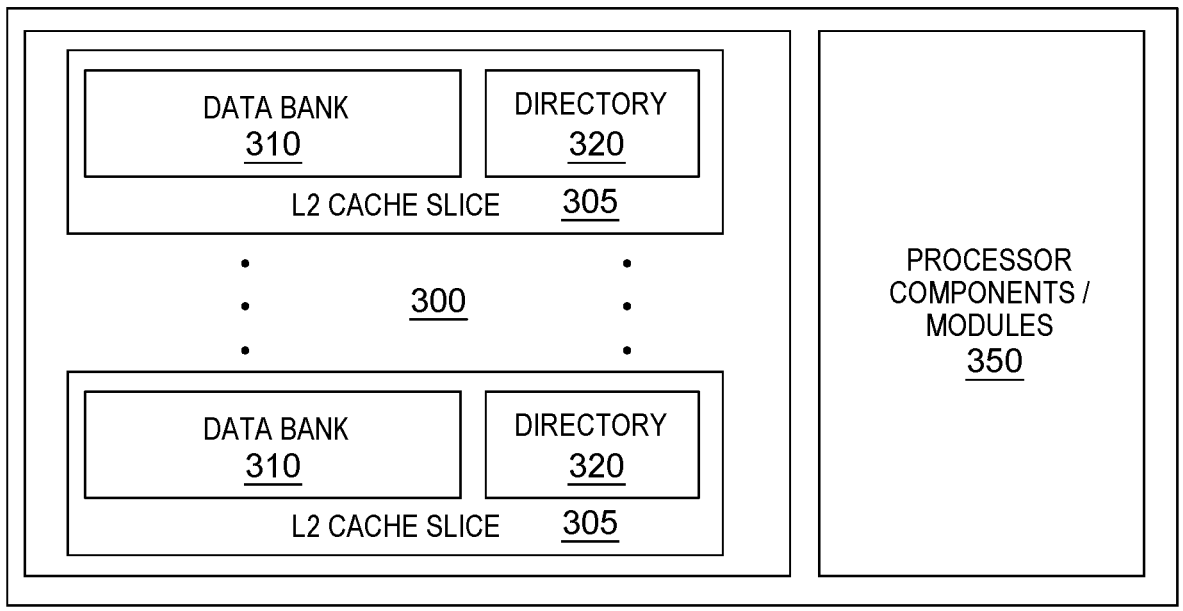
FIG. 3A depicts one example of a bank/directory-based cache, in accordance with one or more aspects of the present disclosure.

Further, in one or more aspects, a processor (e.g., processor 200) has (e.g., includes or is coupled to) a cache (e.g., a second level cache, referred to herein as an L2 cache, another level cache, etc.). One example of a cache is described with reference to FIG. 3A. In one example, a cache, such as a cache 300, has a bank/directory design type and includes one or more cache slices 305 (e.g., L2 cache slices). Each cache slice 305 includes, for instance, one or more data banks (also referred to as data arrays) 310 and one or more directories 320 used to facilitate access to data in the data banks. In one example, a directory (e.g., directory 320) maintains an indication of data stored in a data bank (e.g., data bank 310). In one example, a data bank and a directory are accessed in parallel, and thus, the data bank is accessed speculatively prior to directory results.

In one example, cache 300 is coupled to one or more processor components/modules 350 of a processor (e.g., processor 200).

Figure 3B:
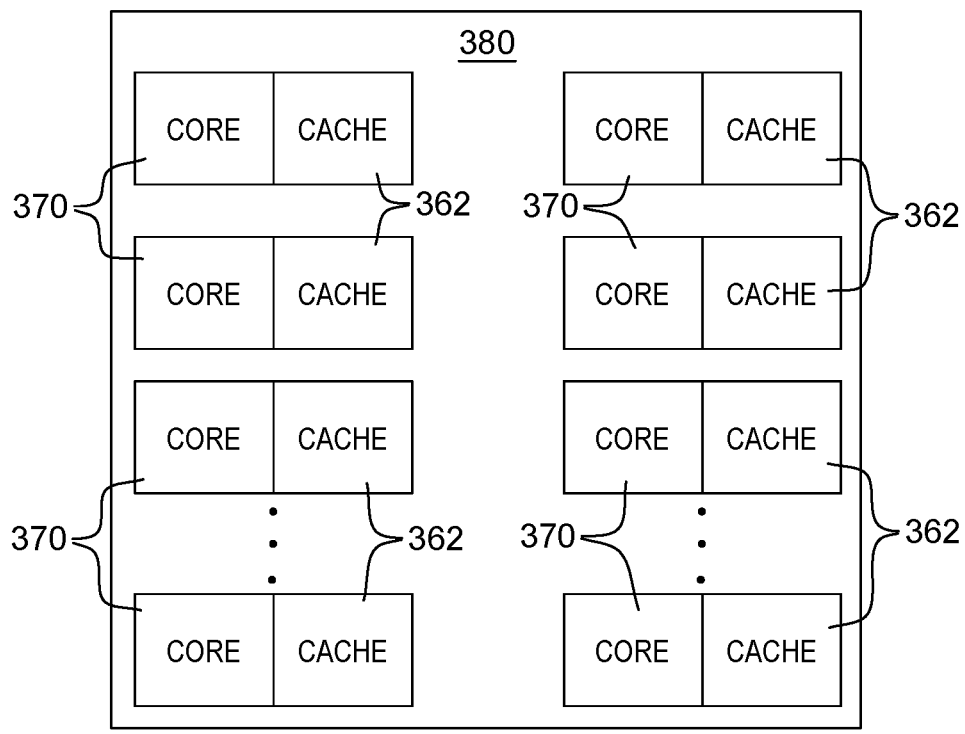
FIG. 3B depicts one example of a coherent-based cache, in accordance with one or more aspects of the present disclosure.

Another example of a cache is described with reference to FIG. 3B. In one example, a cache has a coherent design type and includes a plurality of caches 362 in separate cores 370 across a chip 380. The plurality of caches in the coherent design type is referred to herein as a cache. Although examples of cache designs are provided herein, additional, fewer and/or other cache designs may be used in one or more aspects of the present disclosure. Bank/directory and coherent design types are just examples.

Figure 4A:
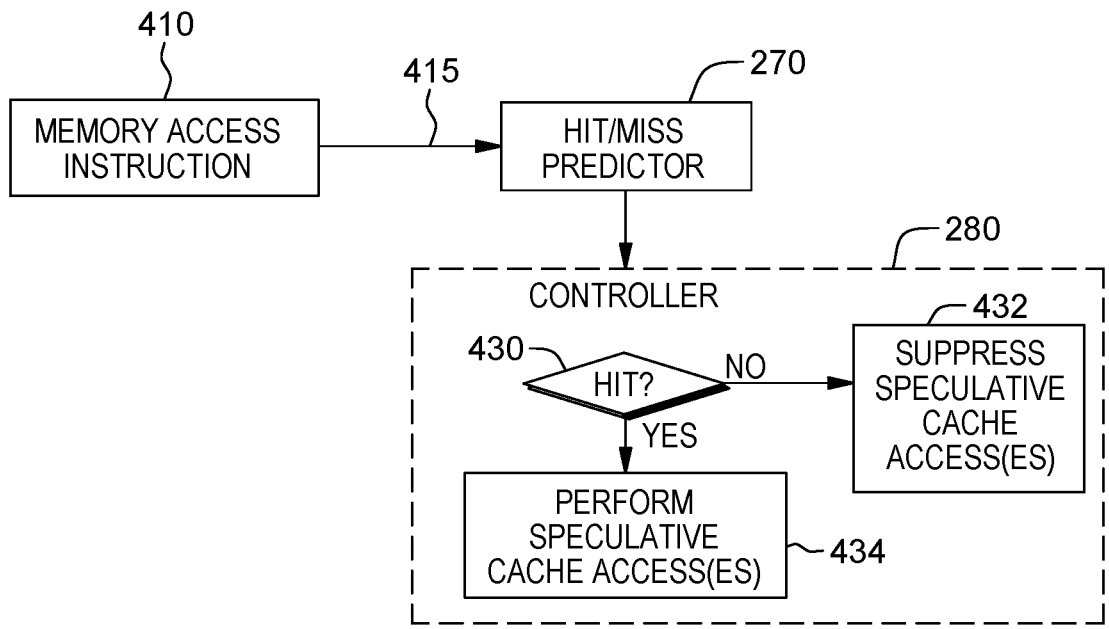
FIG. 4A depicts one example of using a hit/miss predictor in controlling speculative cache accesses in a bank/directory-based cache design, in accordance with one or more aspects of the present disclosure.

One example of using a hit/miss predictor (e.g., hit/miss predictor 270) and a controller (e.g., controller 280) is described with reference to FIG. 4A. In this example, the hit/miss predictor and controller are used to control speculative actions (e.g., speculative cache accesses) based on the cache for which the prediction is being made being a bank/directory-based cache design. In one example, hit/miss predictor 270 obtains, for instance, an input 415, which is generated based on, e.g., an instruction address of a memory access instruction 410. As examples, a memory access instruction is a load instruction, a store instruction or any other instruction that accesses memory. In one example, input 415 is obtained (e.g., received, provided, fetched, etc.) by hit/miss predictor 270 that determines whether the memory access instruction is predicted to hit or miss in a cache, such as a second level cache (e.g., an L2 cache or other level cache). For instance, the predictor determines whether the memory access instruction (or a request for data from a selected cache (e.g., an L2 cache or other level cache)) is predicted to hit or miss in the cache directory (e.g., directory 320). The output of hit/miss predictor 270 is input into controller 280. Controller 280 determines 430 whether the output from hit/miss predictor 270 is a hit. If it is not a hit (i.e., it is a miss), in one example, controller 280 performs a speculative action of suppressing 432 one or more speculative cache accesses. However, if it is a hit, controller 280 performs a speculative action of performing 434 one or more speculative cache accesses. Other examples are possible, including other examples of cache designs that may use this processing.

Figure 5A:
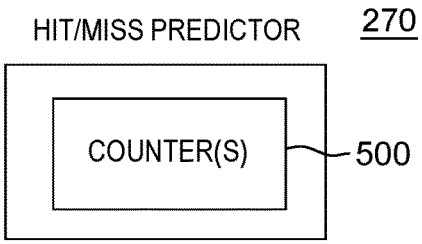
FIG. 5A depicts one example of a hit/miss predictor, in accordance with one or more aspects of the present disclosure.

Further details of one example of a hit/miss predictor (e.g., hit/miss predictor 270) are described with reference to FIG. 5A. In one example, hit/miss predictor 270 includes one or more counters 500 to be used to predict a cache hit or a cache miss. In one example, the prediction is for a subsequent request. Each counter is, for instance, an N-bit saturating counter. In the example of a bank/directory-based cache design (and possibly other designs in other examples), a counter is incremented (e.g., by 1) when there is a directory hit and decremented (e.g., by 1) when there is a directory miss.

In one example, the N-bit saturating counter is a 2-bit counter with a threshold set to, e.g., 2. Other examples are possible. If, for instance, a most significant bit of the counter is a 0, it predicts a miss; if it is a 1, it predicts a hit. Other examples are possible. The counter saturates at the threshold. Example uses of a 2-bit saturating counter for, e.g., a bank/directory-based cache design are provided below:

1. Cache Access A
    a) Predict Miss Counter→00
    b) No Speculative Cache Access
    c) Access A resolves Miss
2. Cache Access B
    a) Predict Miss Counter→00
    b) No Speculative Cache Access
    c) Access B resolves Hit
    d) Increase Counter Counter→01
3. Cache Access C
    a) Predict Miss Counter→01
    b) No Speculative Cache Access
    c) Access C resolves Hit
    d) Increase Counter Counter→10
4. Cache Access D
    a) Predict Hit Counter→10
    b) Speculative Cache Access
    c) Access D resolves Hit
    d) Increase Counter Counter→11

Other examples/variations are possible.

In one example for a bank/directory-based design, on a cache hit prediction, the cache (e.g., cache bank) is accessed speculatively, and a false hit prediction is no worse (in terms of efficiency/costs) than previous techniques. On a cache miss prediction, the cache (e.g., cache bank) is not speculatively accessed and a false miss prediction causes a pipeline recycle (e.g., 10-cycle penalty).

Further details of another example of a hit/miss predictor (e.g., hit/miss predictor 270) are described with reference to FIG. 5B. In one example, hit/miss predictor 270 includes a counter table 520 (or other data structure), which is indexed by a hash 512 of an instruction address (e.g., virtual address 510 or other address) of a memory access instruction (e.g., memory access instruction 410, etc.). As an example, counter table 520 includes one or more entries 521, in which each entry 521 includes, for instance, a tag 522 that includes one or more bits of an instruction address, a tracker 524 to be used as a confidence indicator of the hit-miss prediction for the memory access instruction, and a counter 526 (e.g., an n-bit saturating counter) used to indicate a prediction. An example of counter 526 is, for instance, counter 500. Selection of an entry may be performed by other techniques. Many examples are possible.

Further, in one example, predictor 270 includes a global counter 550 that is updated for each access of the predictor, as described herein. An output of global counter 550 and an output of counter 526 (also referred to as a local counter) are input to a multiplexer 540. Another input to multiplexer 540 is a select control 542, which selects between, for instance, the output of the local counter (e.g., counter 526) and the output of the global counter (e.g., counter 550). The selector is set based, for instance, on whether there is a match 530 between a tag of the virtual instruction address 510 (or other address) and tag 522 of a selected entry 521 of counter table 520. If there is a match, in one example, the value of the local counter (e.g., counter 526) is chosen; otherwise, the value of the global counter (e.g., global counter 550) is chosen.

In one example, the local counters and/or the global counter are saturating counters. For instance, one or more of the counters are 2-bit saturating counters (e.g., a counter 500). However, in other examples, they may be more or less than 2 bits and/or other types of counters; many examples are possible.

In one example, the chosen value is used to determine a cache hit-miss prediction. For instance, the chosen value is compared to a hit-miss threshold. If the chosen value has a predetermined relationship with (e.g., greater than) the hit-miss threshold, then the cache hit-miss prediction 555 is a hit; otherwise, it is a miss. Other predetermined relationships may be used, such as greater than or equal, or any other predetermined value. Many variations are possible.

In one example, a confidence level of the determined prediction (e.g., prediction 555) is ascertained using tracker 524 of the selected entry. In one example, tracker 524 is a counter (e.g., a binary fraction counter) that is initialized to, e.g., 0 and increments (e.g., by 1) when a prediction is a correct prediction. The value of tracker 524 is compared to a confidence threshold (e.g., threshold 560). If, for instance, the value of tracker 524 has a predefined relationship 570 with (e.g., greater than or equal to) a value of threshold 560 of the selected entry, then the determined prediction is used (e.g., prediction 555 is enabled, etc.). Otherwise, the determined prediction is not used (e.g., unenabled, bypassed, ignored). Other predefined relationships may be used, such as greater than, or any other predefined value. Many variations are possible.

In one or more aspects, a predictor (e.g., hit/miss predictor 270, embodiments of which are described with reference to FIGS. 5A, 5B) is used to track cache pipeline activity, and in particular, directory hits/misses of a selected cache (e.g., an L2 cache or other level cache) that has a bank/directory-based design (or other design in other examples).

Further, in one or more aspects, a predictor (e.g., hit/miss predictor 270) and a controller (e.g., controller 280) are used with other types of caches, such as coherent-based cache designs. One example of using a predictor and a controller for a coherent-based cache design is described with reference to FIG. 4B. In this example, the hit/miss predictor and controller are used to track on-chip (or other on-cache) miss activity and to control speculative actions (e.g., speculative off-cache (e.g., off-chip, other cache, other cache level, memory, etc.) data requests) based thereon.

Figure 4B:
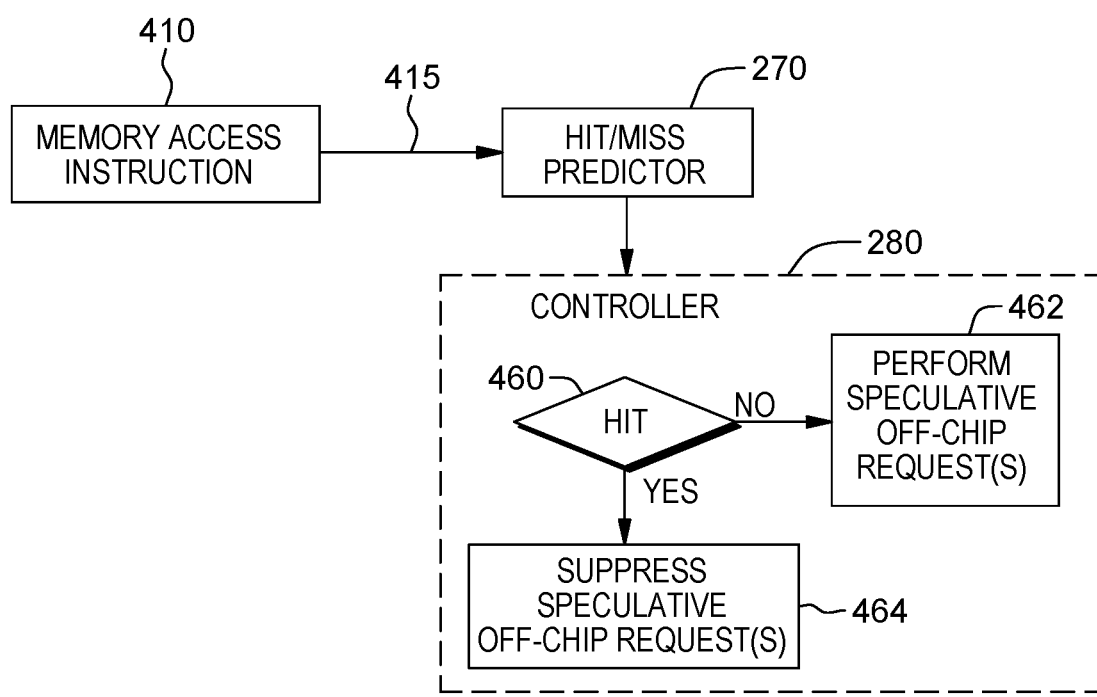
FIG. 4B depicts one example of using a hit/miss predictor in controlling speculative off-cache (e.g., off-chip) requests in a coherent-based cache design, in accordance with one or more aspects of the present disclosure.

Referring to FIG. 4B, in one example, hit/miss predictor 270 obtains, for instance, an input 415, which is generated based on, e.g., an instruction address of a memory access instruction 410. As examples, a memory access instruction is a load instruction, a store instruction or any other instruction that accesses memory. In one example, input 415 is obtained (e.g., received, provided, fetched, etc.) by hit/miss predictor 270 that determines whether the memory access instruction is predicted to hit or miss in an on-chip cache (or other on-cache), such as a second level cache (e.g., an L2 cache or other level cache). For instance, the predictor determines whether the memory access instruction (or a request for data from a selected cache (e.g., an L2 cache or other level cache)) is predicted to hit or miss in, e.g., the on-chip L2 (or other level) cache. The output of hit/miss predictor 270 is input into controller 280. Controller 280 determines 460 whether the output from hit/miss predictor 270 is a hit. If it is not a hit (i.e., it is a miss), in one example, controller 280 performs a speculative action of performing 462 one or more speculative off-chip (or other off-cache) requests to obtain the requested data. However, if it is a hit, controller 280 performs a speculative action of suppressing 464 one or more speculative off-chip (or other off-cache) requests for data. Other examples are possible, including other examples of cache designs that may use this processing.

The hit/miss predictors described herein (e.g., with reference to FIGS. 5A, 5B) may be used for a coherent cache design; however, in one example, incrementing/decrementing of the counters behaves differently than with a bank/directory-based design. For instance, as described with reference to FIG. 5A, hit/miss predictor 270 includes one or more counters 500 to be used to predict a cache hit or miss. In one example, each counter is an N-bit saturating counter. In the example of a coherent-based cache design (and possibly other designs in other examples), however, in one example, a counter is incremented (e.g., by 1) when there is a miss in the on-chip cache (e.g., on-chip L2 cache, other level cache, other on-cache, etc.) and decremented (e.g., by 1) when there is a hit in the on-chip cache (e.g., on-chip L2 cache, other level cache, other on-cache, etc.).

In one example, the N-bit saturating counter is a 2-bit counter with a threshold set to, e.g., 2. Other examples are possible. If, for instance, a most significant bit of the counter is a 0, it predicts a hit; if it is a 1, it predicts a miss. Other examples are possible. The counter saturates at the threshold. Example uses of a 2-bit saturating counter for, e.g., a coherent-based cache design are provided below:
1. Fetch Request A
   a) Predict Hit Counter→00
   b) No Speculative Launch
   c) Fetch A resolves Miss
   d) Increase Counter Counter→01
2. Fetch Request B
   a) Predict Hit Counter→01
   b) No Speculative Launch
   c) Fetch B resolves Miss
   d) Increase Counter Counter→10
3. Fetch Request C
   a) Predict Miss Counter→10
   b) Speculative Launch
   c) Fetch C resolves Miss
   d) Increase Counter Counter→11
4. Fetch Request D
   a) Predict Miss Counter→11
   b) Speculative Launch
   c) Fetch D resolves Miss
Other examples/variations are possible.

Figure 5B:
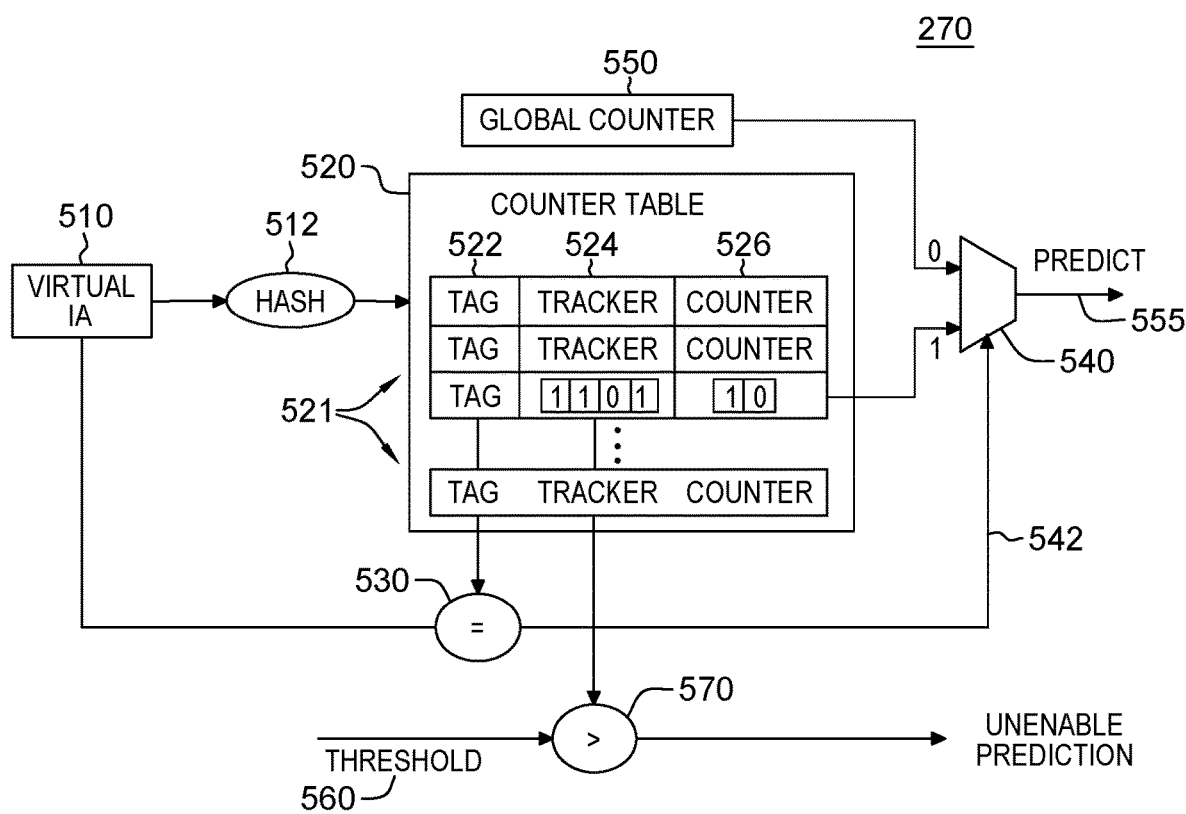
FIG. 5B depicts another example of a hit/miss predictor, in accordance with one or more aspects of the present disclosure.

As indicated, the predictor of FIG. 5B may also be used with the coherent cache design. Other variations are also possible.

Referring to FIG. 5B, in one example, hit/miss predictor 270 includes counter table 520 (or other data structure), which is indexed by hash 512 of an instruction address (e.g., virtual address 510 or other address) of a memory access instruction (e.g., memory access instruction 410, etc.). As an example, counter table 520 includes one or more entries 521, in which each entry 521 includes, for instance, tag 522 that includes one or more bits of an instruction address, tracker 524 to be used as a confidence indicator of the hit-miss prediction for the memory access instruction, and counter 526 (e.g., an n-bit saturating counter) used to indicate a prediction. An example of counter 526 is for instance, counter 500. Selection of an entry may be performed by other techniques. Many examples are possible.

Further, in one example, predictor 270 includes global counter 550 that is updated for each access of the predictor, as described herein. An output of global counter 550 and an output of counter 526 (also referred to as a local counter) are input to multiplexer 540. Another input to multiplexer 540 is select control 542, which selects between, for instance, the output of the local counter (e.g., counter 526) and the output of the global counter (e.g., counter 550). The selector is set based, for instance, on whether there is a match 530 between a tag of the virtual instruction address 510 (or other address) and tag 522 of a selected entry 521 of counter table 520. If there is a match, in one example, the value of the local counter (e.g., counter 526) is chosen; otherwise, the value of the global counter (e.g., global counter 550) is chosen.

In one example, the local counters and/or the global counter are saturating counters. For instance, one or more of the counters are 2-bit saturating counters (e.g., a counter 500). However, in other examples, they may be more or less than 2 bits and/or other types of counters; many examples are possible.

In one example, the chosen value is used to determine a cache hit-miss prediction. For instance, the chosen value is compared to a hit-miss threshold. If the chosen value has a predetermined relationship with (e.g., greater than) the hit-miss threshold, then the cache hit-miss prediction 555 is a hit; otherwise, it is a miss. Other predetermined relationships may be used, such as greater than or equal, or any other predetermined value. Many variations are possible.

In one example, a confidence level of the determined prediction (e.g., prediction 555) is ascertained using tracker 524 of the selected entry. In one example, tracker 524 is a counter (e.g., a binary fraction counter) that is initialized to, e.g., 0 and increments (e.g., by 1) when a prediction is a correct prediction. The value of tracker 524 is compared to a confidence threshold (e.g., threshold 560). If, for instance, the value of tracker 524 has a predefined relationship 570 with (e.g., greater than or equal to) a value of threshold 560 of the selected entry, then the determined prediction is used (e.g., prediction 555 is enabled, etc.). Otherwise, the determined prediction is not used (e.g., unenabled, bypassed, ignored). Other predefined relationships may be used, such as greater than, or any other predefined value. Many variations are possible.

Figure 6:
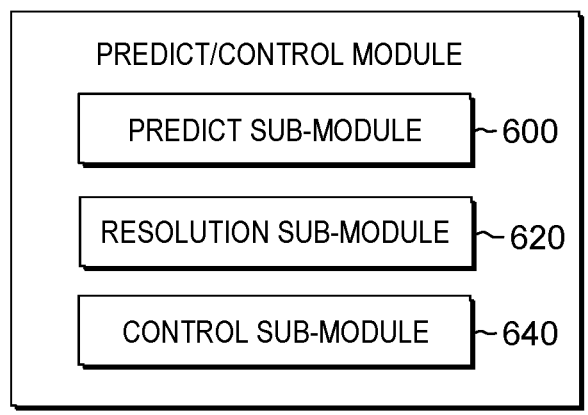
FIG. 6 depicts one example of sub-modules of a predict/control module of FIG. 2, in accordance with one or more aspects of the present disclosure.
Figure 7A:
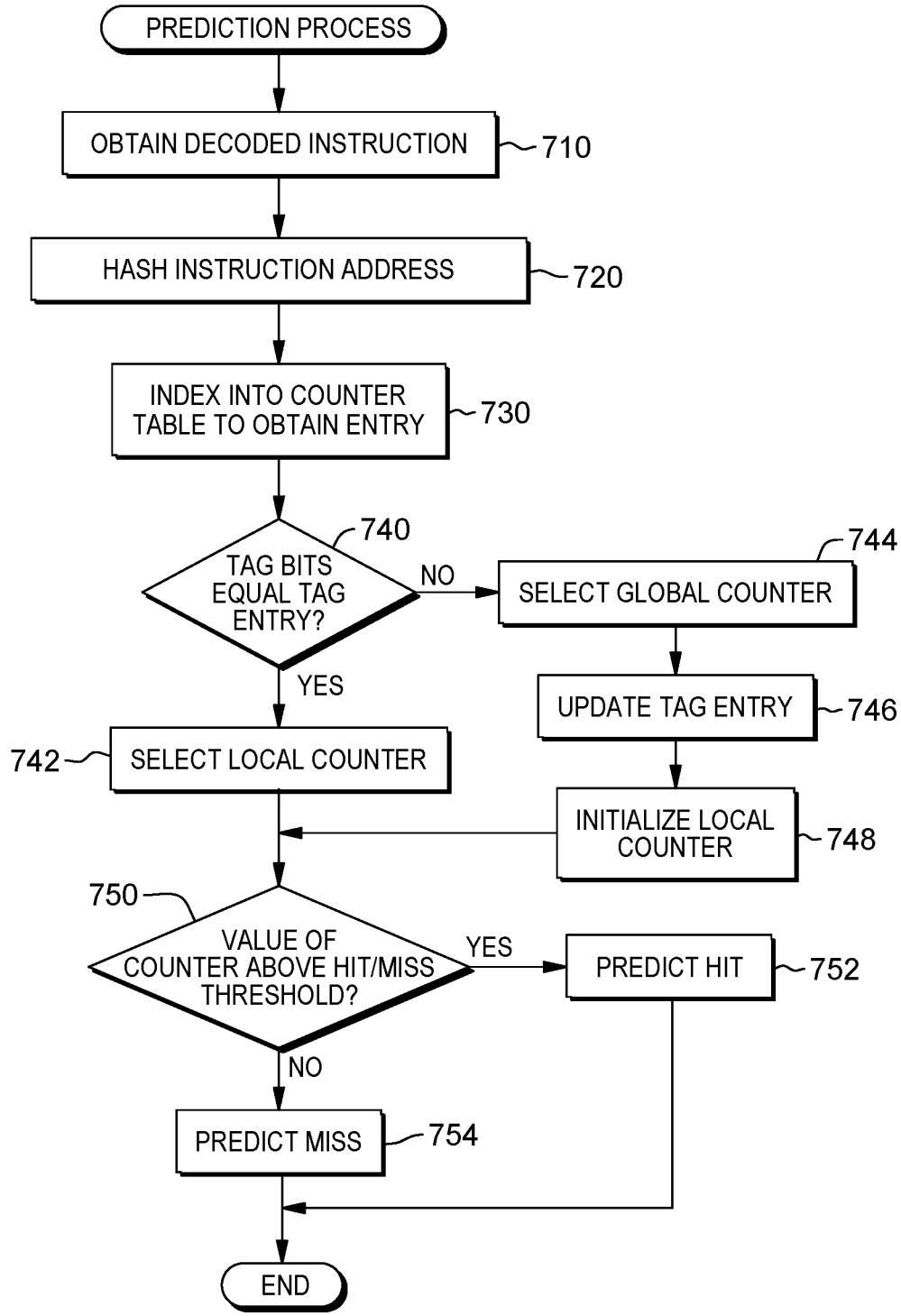
FIG. 7A depicts one example of a prediction process, in accordance with one or more aspects of the present disclosure.
Figure 7B:
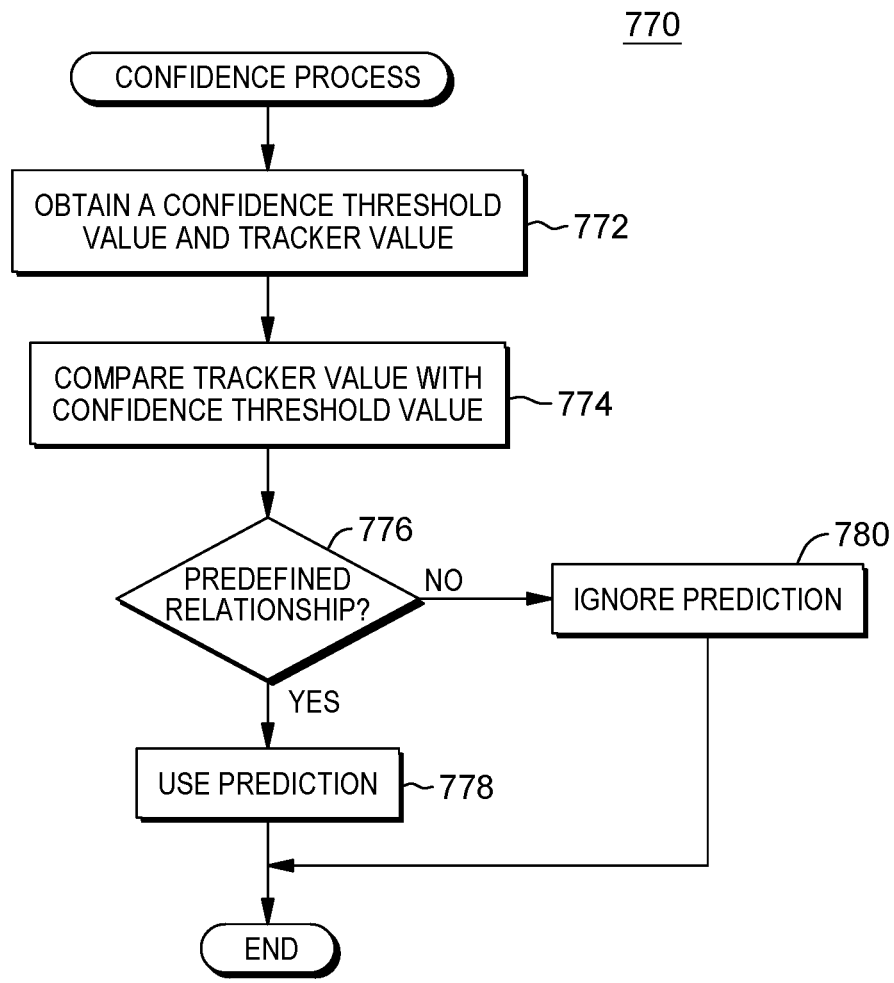
FIG. 7B depicts one example of a confidence process, in accordance with one or more aspects of the present disclosure.
Figure 8:
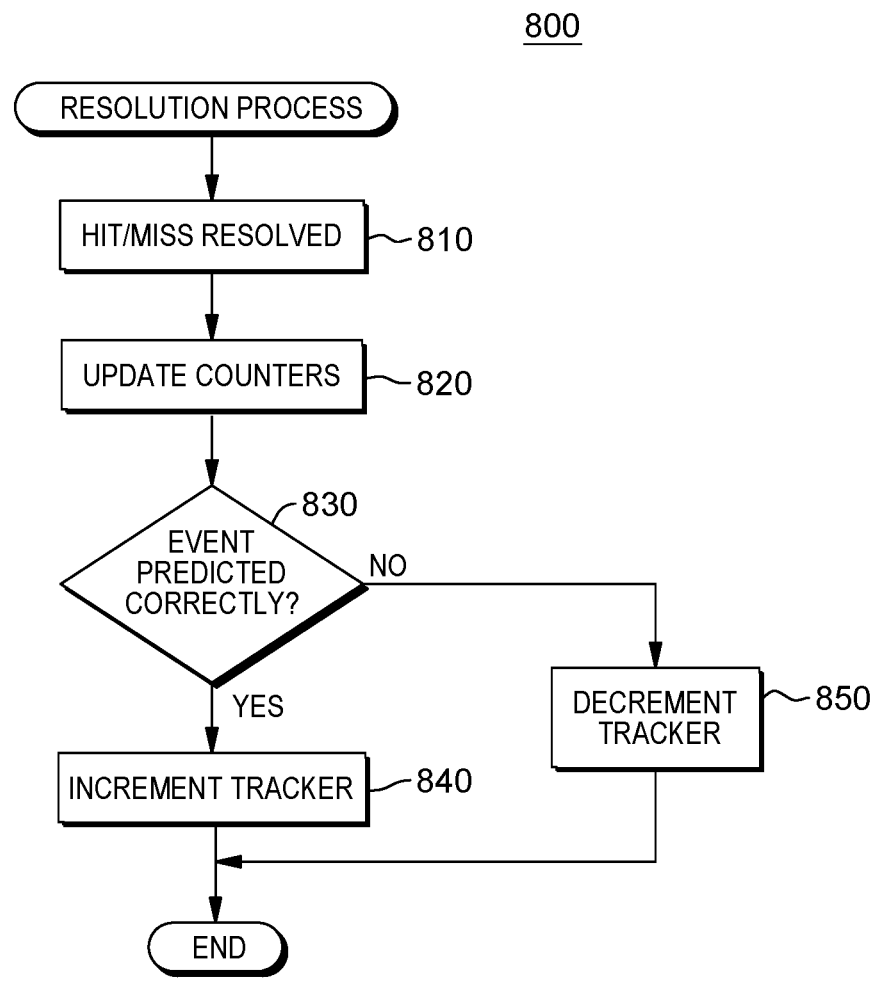
FIG. 8 depicts one example of a resolution process, in accordance with one or more aspects of the present disclosure.
Figure 9A:
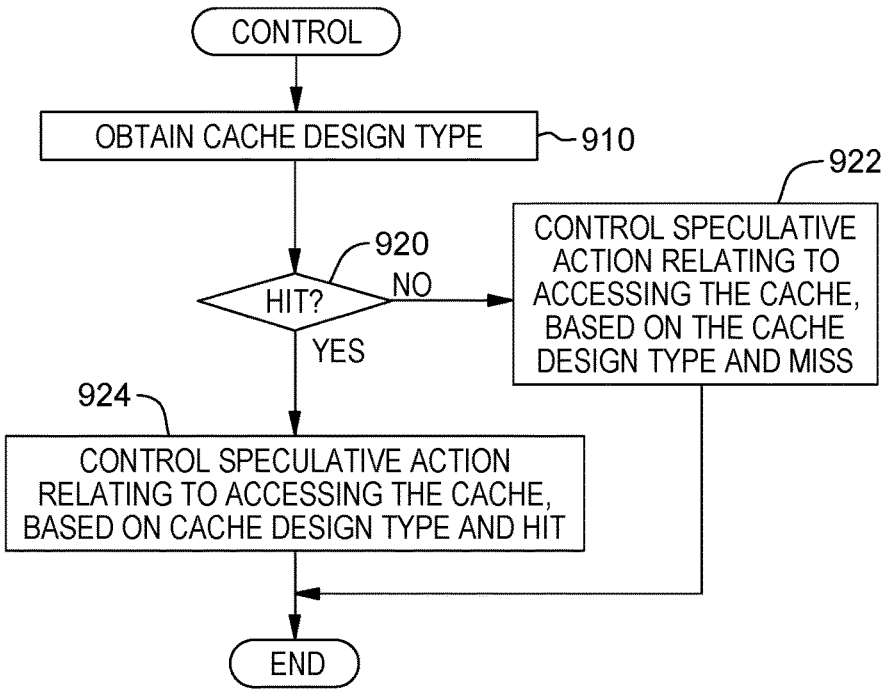
FIGS. 9A-9B depict one example of control processing, in accordance with one or more aspects of the present disclosure.
Figure 9B:
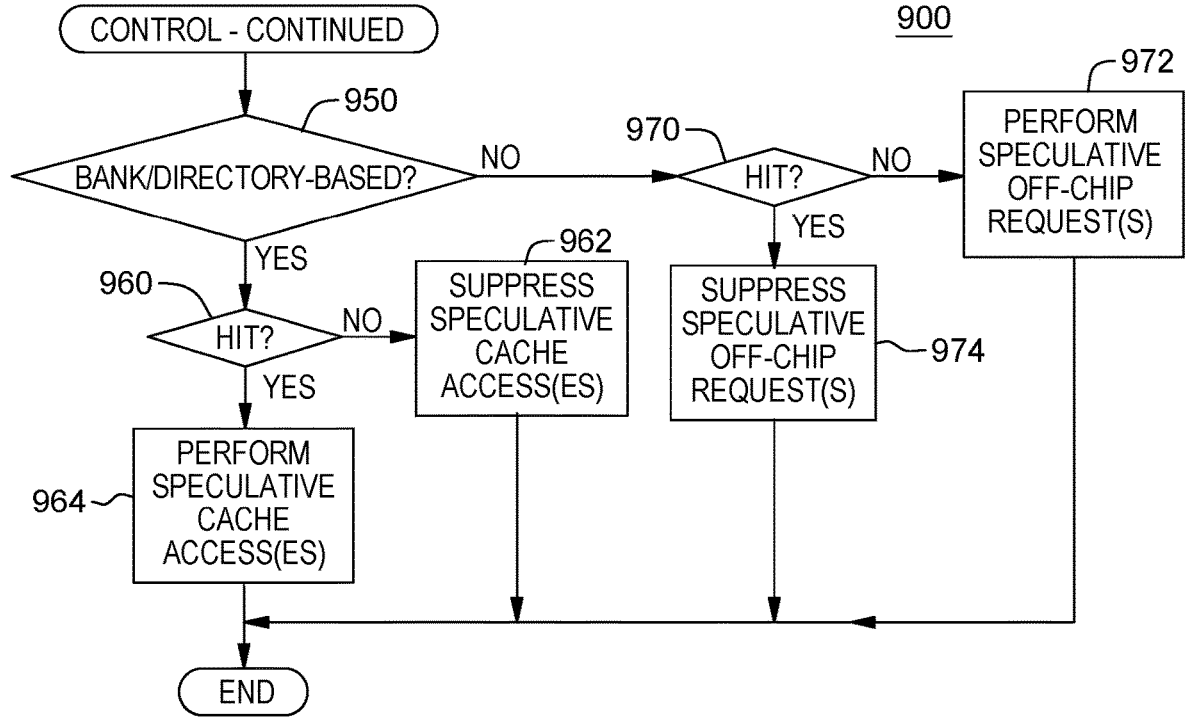

Further details relating to predicting whether a memory access for a selected memory access instruction will result in a hit or miss in a cache (e.g., L2 cache) and processing associated therewith are described with reference to FIGS. 6-9B. This processing may be used for both the bank/directory-based cache designs and the coherent-based cache designs, as examples. Further, the processing may be used for other cache designs in other examples. In one example, FIG. 6 depicts one example of further details of a predict/control module that may be used in predicting cache hit/misses and/or controlling speculative actions based thereon; FIGS. 7A, 7B and 8 depict examples of processing associated with predicting cache hits/misses; and FIGS. 9A-9B depict an example of control processing to control speculative actions.

Referring to FIG. 6, in one example, a predict/control module (e.g., predict/control module 290) includes logic (e.g., circuits, other logic, etc.), code and/or or instructions used to predict cache hit/misses, control speculative actions based thereon and/or perform other processing, in accordance with one or more aspects of the present disclosure. A predict/control module (e.g., predict/control module 290) includes, in one example, various sub-modules to be used to perform processing of one or more aspects of the present disclosure. The sub-modules are implemented, as examples, as logic and/or computer readable program code (e.g., instructions). Based on being implemented as logic, the logic is located, for instance, in a processor (e.g., processor 200), processing circuitry (e.g., processing circuitry 120), etc. Based on being implemented as computer readable program code, the computer readable program code is in, e.g., computer readable storage media, such as storage (e.g., cache 121, persistent storage 113, storage 124, other storage, as examples). The computer readable storage media may be part of one or more computer program products and the computer readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Referring to FIG. 6, in one example, predict/control module 290 includes a predict sub-module 600 to be used to predict a cache hit/miss; a resolution sub-module 620 to be used based on resolving a prediction; and a control sub-module 640 to be used in controlling speculative actions. Predict/control module 290 may include additional, fewer and/or other sub-modules. Many variations are possible. Further, similar modules/sub-modules may be used for other selected purposes.

At least one of the sub-modules (e.g., sub-module 600) is used in a prediction process to predict cache hits/misses. In one example, referring to FIG. 7A, a prediction process (e.g., prediction process 700) is used to predict cache hits/misses, in accordance with one or more aspects of the present disclosure. Process 700 may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to implement and/or execute the process and/or other aspects of the present disclosure. Many examples are possible.

In one example, prediction process 700 uses the predictor described with reference to FIG. 5B. However, other prediction processes may use other predictors, such as the predictor described with reference to FIG. 5A. With such a predictor, one or more of the steps/operations described below with reference to FIG. 7A may not be used. Many variations/examples are possible.

Referring to FIG. 7A, in one example, prediction process 700 (also referred to herein as process 700) obtains 710 a decoded instruction and performs 720 a hash function on an instruction address (e.g., a virtual instruction address, a real instruction address, other address, etc.) of the decoded instruction to obtain a hash value. As an example, the decoded instruction is a memory access instruction, such as a load (store or other memory access) instruction. Process 700 uses the hash value to index 730 into a counter table (e.g., counter table 520) to obtain an entry (e.g., entry 521) of the counter table. Process 700 determines 740 whether tag bits of the instruction address are a match to tag bits of the selected entry (e.g., tag 522). If there is a match, in one example, process 700 selects 742 a local counter (e.g., counter 526) as a chosen counter. However, if there is no match, in one example, process 700 selects 744 a global counter (e.g., global counter 550) as the chosen counter. Further, in one example, based on the global counter being chosen, process 700 creates/updates 746 a tag entry of the counter table to reflect the instruction address and initializes 748 the local counter of the entry.

Moreover, in one example, process 700 determines 750 whether a value of the chosen counter has a predetermined relationship with (e.g., greater than) a selected value of a hit-miss threshold (e.g., 01 representing a weak miss, other selected values). Based on the value of the chosen counter having the predetermined relationship with the selected value of the hit-miss threshold, process 700 indicates 752 that the hit-miss prediction is a cache hit (e.g., prediction 555 is a cache hit). Further, based on the value of the chosen counter not having the predetermined relationship with the selected value of the hit-miss threshold, process 700 indicates 754 that the hit-miss prediction is a cache miss (e.g., prediction 555 is a cache miss).

Although an example predetermined relationship is provided, one or more other predetermined relationships may be used. Further, other selected values may be used. Yet further, in other embodiments, the threshold is not used. Many variations are possible.

In one or more aspects, the determined prediction is used based on a certain confidence level of the determined prediction. Therefore, in accordance with one or more aspects, a confidence process is used to determine the confidence of the determined prediction. At least one of the sub-modules (e.g., sub-module 600) is used in a confidence process to determine the confidence of the determined prediction. In one example, the confidence process is used based on the local counter being chosen. However, in other embodiments, the confidence process may be used regardless of the chosen counter. If the confidence process is used for the global counter, in one example, a tracker value is assumed for the global counter and that value is assumed, in one example, to have the predefined relationship with the confidence threshold (i.e., the prediction based on the global counter is enabled). Further, in other embodiments, the confidence process is not used. Other examples and variations are possible.

In one example, referring to FIG. 7B, a confidence process (e.g., confidence process 770) is used to determine whether the determined prediction is to be used to control speculative actions, in accordance with one or more aspects of the present disclosure. Process 770 may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute the process and/or other aspects of the present disclosure. Many examples are possible.

Referring to FIG. 7B, in one example, confidence process 770 (also referred to herein as process 770) obtains 772 a confidence threshold value and a tracker value. In one example, the tracker value is provided by a tracker (e.g., tracker 524), which is, e.g., a binary fraction counter (however, other types of counters and trackers may be used). The tracker value is obtained from the selected counter table entry (e.g., the entry corresponding to the memory access instruction). Process 770 compares 774 the tracker value with the confidence threshold value and determines 776 whether the tracker value (e.g., tracker 524) has a predefined relationship with (e.g., greater than or equal to) the confidence threshold value (e.g., threshold 560). Based on the tracker value (e.g., tracker 524) having the predefined relationship 570 with (e.g., greater than or equal to) the confidence threshold value (e.g., threshold 560), process 770 indicates that the determined prediction is to be is to be used 778 (e.g., prediction 555 is enabled); otherwise, process 770 indicates that the determined prediction is to be ignored 780 (e.g., prediction 555 is unenabled). Again, the predefined relationship may be other than greater than or equal. Many variations are possible.

Further details relating to processing when a cache hit/miss is resolved are described with reference to FIG. 8. In one example, a resolution process (e.g., resolution process 800) is based on a cache hit or miss being resolved, in accordance with one or more aspects of the present disclosure. Process 800 may use one or more of the sub-modules (e.g., sub-module 620) of predict/control module 290 and may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute the process and/or other aspects of the present disclosure. Many examples are possible.

Referring to FIG. 8, in one example, resolution process 800 (also referred to herein as process 800) determines 810 that a cache hit/miss has been resolved. Based thereon, resolution process 800 updates 820 the local and/or global counters, as described herein. For instance, the counters are incremented and/or decremented based on a resolved hit/miss and based on the type of cache design. As an example, based on a directory hit for the bank/directory-based cache design, the local and/or global counter is incremented, and for a miss, it (they) is (are) decremented. Further, based on an on-cache (e.g., on-chip, other on-cache) miss for the coherent-based cache design, the local and/or global counter is incremented, and for a hit, it (they) is (are) decremented. Additional, fewer and/or other levels may also be used.

Further, in one example, resolution process 800 determines 830 whether the event predicted correctly. For instance, if the predictor (e.g., predictor 270) accurately predicted a hit or a miss, then resolution process 800 updates (e.g., increments 840, e.g., by 1) the appropriate tracker (e.g., tracker 524 of the entry corresponding to the instruction), based on utilization of a tracker and resolution processing is complete. Otherwise, if the predictor did not accurately predict a hit or a miss, then, in one example, the tracker is updated by, e.g., decrementing 850 the tracker, e.g., by 1, and resolution processing is complete. In other examples, the tracker is not used.

In one or more aspects, the prediction, provided by a predictor (e.g., predictor 270, regardless of embodiment), is used to control speculative action. In one or more aspects, the control is based on the type of cache design (e.g., bank/directory-based, coherent-based, etc.). Further details regarding controlling speculative action based on the type of cache design and whether the prediction is a miss or a hit are described with reference to FIGS. 9A-9B. In one example, FIG. 9A depicts an overview of the control processing, and FIG. 9B depicts further details of the control processing.

Referring to FIG. 9A, in one example, a control process (e.g., control process 900) is used to control speculative actions, in accordance with one or more aspects of the present disclosure. Process 900 may use one or more of the sub-modules (e.g., sub-module 640) of predict/control module 290 and may be implemented and/or executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor sets and/or other processors or nodes; processing circuitry, such as processing circuitry 120 of processor set 110 and/or other processors sets and/or other processing circuitry; and/or other computing devices, etc.). Additional and/or other computers, servers, devices, processors, nodes, processing circuitry and/or computing devices may be used to execute the process and/or other aspects of the present disclosure. Many examples are possible.

Referring to FIG. 9A, in one example, control process 900 (also referred to herein as process 900) obtains 910 (e.g., knows, determines, is provided, retrieves, etc.) a cache design type. Further, control process 900 determines 920 whether the predictor predicted a hit or a miss. Based on a miss being predicted and the cache design type, process 900 controls 922 a speculative action relating to accessing the cache, as described below. Further, based on a hit being predicted and the cache design type, process 900 controls 924 a speculative action relating to accessing the cache, as described below.

Further details of examples of the controlling (e.g., 922/ 924) are described with reference to FIG. 9B. In one example, control process 900 determines 950 whether the cache design type is, e.g., bank/directory-based. Based on the cache design being a bank/directory-based design, process 900 further determines 960 whether the prediction is a hit. If the prediction is a miss and the cache design is bank/directory-based, process 900 suppresses 962 one or more speculative cache accesses; otherwise, if the prediction is a hit and the cache design is bank/directory-based, process 900 performs 964 one or more speculative cache accesses. In other examples, this processing may be used for other cache designs.

However, in one example, based on process 900 determining 950 that the cache design is not a bank/directory-based cache, but instead is, for instance, a coherent-based cache design, process 900 determines 970 whether the prediction is a hit. If the prediction is a miss and the cache design is coherent-based, process 900 performs 972 one or more speculative off-cache (e.g., off-chip, other off-cache) requests for data; otherwise, if the prediction is a hit and the cache design is coherent-based, process 900 suppresses 974 one or more speculative off-cache (e.g., off-chip, other off-cache) requests for data. In other examples, this processing may be used for other cache designs.

In one or more aspects, a cache hit/miss predictor is used to predict cache hit/misses. In one or more aspects, the hit/miss predictor (e.g., hit/miss predictor 270) is accessed at decode time (at or about decode) of a memory access instruction and the prediction is used to determine whether a speculative action (e.g., speculative cache accesses, speculative off-cache requests) is to be performed.

In one or more aspects, a saturating counter (which is, at least, part of the predictor) is provided and a request for data from a cache is received. Based on a cache hit for, e.g., a bank/directory-based cache and a cache miss for, e.g., a coherent-based cache, the saturating counter is incremented (e.g., by 1), and based on a cache miss for, e.g., the bank/directory-based cache and a cache hit for the coherent-based cache, the saturating counter is decremented (e.g. by 1). A most significant bit of the saturating counter is utilized, in one example, to predict whether the following cache access will be a hit or a miss.

In one example, the saturating counter is a global saturating counter based predictor that is checked based, for instance, on decoding of a load or store instruction (or other memory access instruction). Based on a most significant bit of the global saturating counter being set (e.g., a 1), a hit is predicted for a bank/directory-based cache and a miss is predicted for a coherent-based cache; and based on a most significant bit of the global saturating counter not being set (e.g., a 0), a miss is predicted for a bank/directory-based cache and a hit is predicted for a coherent-based cache. Subsequent to resolving the hit/miss, the global saturating counter is updated. Such a counter may also be used for other cache design types.

In one example, the saturating counter is a local saturating counter based predictor, in which one or more saturating counters are indexed by using one or more instruction addresses. A load or a store instruction (or other memory access instruction), as an example, is decoded, and an instruction address (e.g., virtual instruction address, other address) of the decoded instruction is hashed (e.g., utilizing a hashing function, such as lower bit modulo, parameterized random, etc.) to index into a saturating counter table to obtain a local saturating counter. In one example, the most significant bit of the local saturating counter is checked. Based on the most significant bit of the local saturating counter being set (e.g., a 1), a hit is predicted for a bank/directory-based cache and a miss is predicted for a coherent-based cache; and based on a most significant bit of the local saturating counter not being set (e.g., a 0), a miss is predicted for a bank/directory-based cache and a hit is predicted for a coherent-based cache. Subsequent to resolving the hit/miss, the local saturating counter is updated.

As indicated, in one or more aspects, local and/or global counters may be used to perform cache hit/miss predictions. Further, various variants of the local and/or global counters may be used. For instance, a local saturating counter with a global initialization predictor address tag bits (total/partial) entry is to default to global history on initialization. Other examples are possible.

In another hit/miss predictor example, different behaviors of different access types (e.g., instruction vs. data accesses) use different predictors. For example, instruction accesses use global predictors, and data accesses use local predictors. In one or more aspects, a hit/miss predictor (e.g., hit/miss predictor 270) is used to predict data cache accesses, as well as instruction cache accesses. In one or more aspects, the cache hit/miss predictor uses an instruction global counter for instruction accesses. In one example, the output of multiplexer 540 (FIG. 5B) is input to another multiplexer, which also receives as input, an output of the instruction global counter. Further, the select control of the other multiplexer is a data access control in which if it is a data access, the output of multiplexer 540 is selected; otherwise, if it is an instruction access, the output of the instruction global counter is selected. Many variations are possible. Other examples are possible.

Further, in another hit/miss predictor example, specific accesses that are difficult to predict are captured; i.e., those accesses that have an accuracy above a selected threshold are predicted. In another hit/miss predictor example, patterns with biases on hit/miss behavior are captured; e.g., N-bit shift register stores the hit/miss results of the last N accesses and uses that to index into a local predictor table, instead of using an instruction address based indexing. Many other variations/examples are possible.

One or more aspects of the present disclosure are tied to computer technology and enhance processing within a computer, improving performance thereof. For instance, performance is improved by predicting cache misses and performing speculative actions based thereon (e.g., suppressing cache accesses/performing speculative off-cache (e.g., off-chip) data requests, etc.). Performance of computer systems with memory hierarchies and a pipelined architecture is increased. Cache pipeline efficiency is enhanced by predicting cache hits/misses in order to expedite cache data returns to a requesting agent and/or to reduce speculative cache accesses to limit contention and/or queuing effects.

In one or more aspects, with bank/directory-based caches, predictions are based off of bursty access patterns (e.g., cache misses tend to come in groups). Further, power consumption is reduced, a hit-after-miss multiple (e.g., 10)-cycle stall penalty is eliminated (or reduced), and false queuing is reduced. Performance is increased. Processing within a processor, computer system and/or computing environment is improved.

In one or more aspects, with coherent-based caches, predictions are based off of bursty access patterns (e.g., cache misses tend to come in groups). Scope level cache misses are predicted within a distributed cache design (e.g., coherent-based) via a predictor (e.g., a scope miss predictor). In one or more aspects, the predictor may be, for instance, an n-bit counter (global or local, as described herein). In one or more aspects, the predictor may be segmented into a plurality of counters for independent address spaces (e.g., hashed indexed table, per pipe/slice, etc.). In one or more aspects, the counters of a predictor may track per core events on a processor chip with multiple cores (e.g., individual core chip hits/misses within a larger context, in which the base may be a global scope). In one or more aspects, off-chip latency is reduced, and performance is increased. Processing within a processor, computer system and/or computing environment is improved.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement and/or perform prediction and/or speculative actions and/or to implement and/or perform one or more other aspects of the present disclosure.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other memory access instructions may be used. Further, other predictors may be used, including, but not limited to, other examples of a counter table and/or a global counter. Moreover, other cache designs may be used. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
    determining a cache hit-miss prediction for a memory access instruction, the determining the cache hit-miss prediction for the memory access instruction using a predictor;
    ascertaining a type of cache design to be accessed by the memory access instruction, the type of cache design being one cache design of a bank/directory-based cache design and a coherent-based cache design; and
    controlling one or more speculative actions, based on determining the cache hit-miss prediction is a miss, wherein the controlling is further based on the type of cache design ascertained to be accessed by the memory access instruction.

2. The computer-implemented method of claim 1, wherein the controlling the one or more speculative actions comprises suppressing one or more speculative cache accesses.

3. The computer-implemented method of claim 1, wherein the type of cache design is the bank/directory-based cache design, and wherein the controlling the one or more speculative actions comprises suppressing one or more speculative cache accesses.

4. The computer-implemented method of claim 1, wherein the controlling the one or more speculative actions comprises performing one or more speculative off-cache requests for data.

5. The computer-implemented method of claim 1, wherein the type of cache design is the coherent-based cache design, and wherein the controlling the one or more speculative actions comprises performing one or more speculative off-cache requests for data.

6. The computer-implemented method of claim 1, further comprising:
    controlling one or more other speculative actions, based on determining that the cache hit-miss prediction for another memory access instruction is a hit, wherein the controlling is further based on the type of cache design.

7. The computer-implemented method of claim 6, wherein the type of cache design is the bank/directory-based cache design, and wherein the controlling the one or more other speculative actions comprises performing one or more speculative cache accesses.

8. The computer-implemented method of claim 6, wherein the type of cache design is the coherent-based cache design, and wherein the controlling the one or more other speculative actions comprises suppressing one or more speculative off-cache requests for data.

9. The computer-implemented method of claim 1, wherein the predictor includes a saturating counter, and wherein the determining the cache hit-miss prediction for the memory access instruction includes checking a most significant bit of the saturating counter.

10. The computer-implemented method of claim 9, wherein based on the most significant bit of the saturating counter being a selected value, the cache hit-miss prediction is a miss.

11. The computer-implemented method of claim 1, wherein the determining the cache hit-miss prediction for the memory access instruction includes:
    obtaining a value of a counter of the predictor;
    comparing the value of the counter to a hit-miss threshold; and
    determining the cache hit-miss prediction, based on a comparison of the value of the counter with the hit-miss threshold.

12. The computer-implemented method of claim 11, wherein the determining the cache hit-miss prediction for the memory access instruction further comprises:
    ascertaining a prediction confidence level of the cache hit-miss prediction; and
    using the prediction confidence level of the cache hit-miss prediction to determine the cache hit-miss prediction.

13. A computer system for facilitating processing within a computing environment, the computer system comprising:
    at least one computing device; and
    program instructions, collectively stored in a set of one or more computer readable storage media, for causing the at least one computing device to perform the following computer operations including:
        determining a cache hit-miss prediction for a memory access instruction, the determining the cache hit-miss prediction for the memory access instruction using a predictor;
        ascertaining a type of cache design to be accessed by the memory access instruction, the type of cache design being one cache design of a bank/directory-based cache design and a coherent-based cache design; and
        controlling one or more speculative actions, based on determining the cache hit-miss prediction is a miss, wherein the controlling is further based on the type of cache design ascertained to be accessed by the memory access instruction.

14. The computer system of claim 13, wherein the controlling the one or more speculative actions comprises suppressing one or more speculative cache accesses.

15. The computer system of claim 13, wherein the controlling the one or more speculative actions comprises performing one or more speculative off-cache requests for data.

16. A computer program product for facilitating processing within a computing environment, the computer program product comprising:
    a set of one or more computer readable storage media; and
    program instructions, collectively stored in the set of one or more computer readable storage media, for causing at least one computing device to perform the following computer operations including:
        determining a cache hit-miss prediction for a memory access instruction, the determining the cache hit-miss prediction for the memory access instruction using a predictor;
        ascertaining a type of cache design to be accessed by the memory access instruction, the type of cache design being one cache design of a bank/directory-based cache design and a coherent-based cache design; and
        controlling one or more speculative actions, based on determining the cache hit-miss prediction is a miss, wherein the controlling is further based on the type of cache design ascertained to be accessed by the memory access instruction.

17. The computer program product of claim 16, wherein the controlling the one or more speculative actions comprises suppressing one or more speculative cache accesses.

18. The computer program product of claim 16, wherein the controlling the one or more speculative actions comprises performing one or more speculative off-cache requests for data.

19. The computer-implemented method of claim 1, wherein the one or more speculative actions comprises one speculative action based on the type of cache design being the bank/directory-based cache design and a different speculative action than the one speculative action based on the type of cache design being the coherent-based cache design.

20. The computer-implemented method of claim 19, wherein the one speculative action includes suppressing one or more speculative cache accesses and the different speculative action includes performing one or more speculative off-cache requests for data.

* * * * *